Patented Feb. 12, 1935

1,990,475

UNITED STATES PATENT OFFICE 1,990,475

ASPHALTENE VARNISH

Alfonso Miguel Alvarado, Wilmington, Del., assignor to E. I. du Pont de Nemours & Company, Wilmington, Del., a corporation of Delaware No Drawing. Application March 20, 1931.
Serial No. 524,208

11 Claims. (Cl. 134—26)

This invention relates to coating compositions, more particularly to coating compositions containing an asphaltic material and still more particularly to coating compositions comprising asphaltenes dissolved in a volatile solvent and substantially free from petrolenes.

So far as is known, asphaltenes unaccompanied by petrolenes have not been used or proposed for use in coating compositions. The process which has been developed for separating asphaltenes from asphalts is essentially a well known analytical process and is described in "Asphalts and Allied Substances" by Abraham, 3rd Ed., pages 724 and 756. This process consists in precipitating asphaltenes from a concentrated xylol solution of asphalt by treating the asphalt solution with a large volume of low boiling gasoline in which the asphaltene constituent of the asphalt is insoluble and in which the petrolene constituent is soluble. This process is also disclosed in British Patent 313,433, issued December 2, 1929, which describes the preparation of light colored products by treating petroleum residues, asphalts, or similar substances, with precipitating agents such as gasoline, pentane, or other light hydrocarbons poor in aromatic constituents. The petrolenes are then separated from the asphaltenes and, according to the above mentioned patent, may be used in the manufacture of asphalt emulsions, asphalt paper, lacquers and varnishes, asphalt paints, etc. However, the use of asphaltenes for the production of coating compositions having certain desirable characteristics, and the recognition of the advantages inherent in such coating compositions for the particular purposes hereinafter disclosed, as distinguished from the uses of petrolenes mentioned in the above patent, are believed to be new.

An object of this invention is the preparation of coating compositions comprising asphaltenes dissolved in a volatile solvent and substantially free from petrolenes.

A further object resides in the production of coated products from the coating compositions referred to.

These objects are accomplished by a process involving the fractional precipitation of asphaltenes from asphalt solutions, separation and purification of the precipitated asphaltenes, and incorporation of the purified asphaltenes into coating compositions, as will be described more fully below.

The fraction of the non-mineral constituents of bitumens which is insoluble in 88° Bé. naphtha is referred to herein as "asphaltenes". The fraction of the non-mineral constituents of bitumens which is soluble in 88° Bé. naphtha is referred to herein as "petrolenes". The exact composition of asphaltenes and petrolenes is not known, but they are generally regarded as mixtures of saturated and unsaturated straight chain hydrocarbons and polycyclic hydrocarbons containing colloidal carbon.

The process by which asphaltenes are prepared involves the solution of an asphalt in a solvent which will dissolve both the asphaltene and the petrolene fractions, for example, chloroform, xylol, or turpentine, and treatment of this solution with a large volume of low boiling gasoline or pentane, which process precipitates the asphaltenes substantially free from petrolenes. The following example is given to illustrate more fully the method of preparing asphaltenes.

A 2400 gram sample of petroleum asphalt is dissolved in 1640 grams of xylol, solution being effected by adding solvent to the molten asphalt. The resulting solution after cooling is poured slowly into 24,000 grams (about 10 gallons) of 86–88° Baumé gasoline with constant stirring. The asphaltenes precipitated by this treatment are filtered, washed on the filter with one gallon of 86–88° Baumé gasoline, dried, and powdered. The yield of asphaltenes is 1033 grams or 41.3% of the asphalt originally taken.

Asphaltenes may be obtained from a number of bituminous substances, such as petroleum asphalts, sludge asphalts, residual asphalts, mineral waxes, or asphaltites, the latter term including such materials as gilsonite, glance pitch, and grahamite. I prefer to use petroleum asphalts as the source of asphaltenes and, in particular, to use steam-refined petroleum residue asphalts rather than blown petroleum residue asphalts. My preference for steam-refined asphalts is due to the superior durability shown by finishes containing asphaltenes derived from this type of petroleum asphalt as compared with the durability shown by finishes containing asphaltenes derived from blown asphalts.

Asphaltenes prepared in the manner described above are dark brown to black powders. They swell and decompose on heating, but do not melt. Asphaltenes are readily soluble in chlorinated hydrocarbons, aromatic hydrocarbons, and turpentine; are partially soluble in esters and the higher boiling aliphatic hydrocarbons; and are insoluble in alcohols and ethers. Since asphaltenes decompose on heating, it is necessary to dissolve them by mixing with hot solvent rather than by melting prior to the addition of solvent. Solutions of asphaltenes in suitable solvents give finishes which dry rapidly, are high in luster, are very black in color, and are very brittle and friable. On baking, the films become very hard and adherent and are insoluble in most solvents. Asphaltenes are compatible with a number of drying oils, synthetic resins, and softeners. This makes it possible to modify the properties of the films in many ways. Drying oils impart toughness and flexibility; polyhydric alcohol-polybasic acid resins impart adhesion, toughness, and a certain amount of flexibility; while softeners impart flexibility.

In preparing coating compositions containing asphaltenes, I prefer first to dissolve the asphaltenes in a suitable solvent by the process known as cold cutting. This consists in adding finely divided asphaltenes to the solvent, stirring the mixture, and heating gently to accelerate the solution process. Asphaltene solutions prepared in this manner are then mixed with solutions of modifying or blending agents in suitable solvents and in the proper proportions. The solvents best suited for asphaltene coating compositions are chlorinated hydrocarbons, aromatic hydrocarbons, and turpentine. Solutions of asphaltenes without modifying agents may be used as finishes, but better results are obtained if such modifying agents as raw or bodied drying oils, fatty acids, asphalt oils, polyhydric alcohol-polybasic acid resins and other synthetic resins, fossil gums, rosin, and other natural resins, cellulose derivatives, etc., are incorporated into the finish. As stated above, raw or bodied oils may be used in these systems, but in the case of linseed oil care should be taken not to body the oil beyond the stage at which it is completely compatible with asphaltenes. Also, with China-wood oil, care should be taken to cure the oil sufficiently to prevent frosting or wrinkling when it is used in the asphaltene varnishes. Still better results are obtained if a suitable blending agent is incorporated into the finish to improve the compatability of asphaltenes with modifying agents. Examples of blending agents found to be effective are cobalt, lead, manganese, or iron salts of certain organic acids such as abietic, oleic, ricinoleic, linoleic, and lauric acids. These salts not only improve compatibility, but also protect the film to some extent from the destructive action of sunlight, since they are opaque to ultraviolet light. If the asphaltene coating composition comprises a drying oil, these iron salts function as driers as well as blending agents.

The following examples are illustrative of the different types of coating compositions in which asphaltenes are particularly useful.

Example I

| | Parts by weight |
|---|---|
| Asphaltenes | 100.00 |
| Solvent naphtha | 100.00 |
| Turpentine substitute | 28.69 |
| Iron resinate (7.3% iron) | 12.29 |
| Total | 240.98 |

This varnish is prepared by cold blending a solution of asphaltenes in solvent naphtha with a solution of iron resinate in turpentine substitute, said solution of iron resinate containing 2.4% iron.

Example II

| | Parts by weight |
|---|---|
| Asphaltenes | 100.00 |
| Solvent naphtha | 100.00 |
| Turpentine | 40.00 |
| Bodied China-wood oil | 35.55 |
| Iron oleate (8% iron) | 4.45 |
| Total | 280.00 |

This varnish is prepared by cold blending a solution of asphaltenes in solvent naphtha with a turpentine solution of China wood oil bodied with iron oleate. The oil used in the above varnish is prepared from the following ingredients, using the proportions indicated.

| | Parts by weight |
|---|---|
| Raw China-wood oil | 88.86 |
| Iron oleate (containing 8% iron) | 11.14 |
| Total | 100.00 |

The China wood oil is heated to 385° F., and the iron oleate is added slowly at this temperature. The oil is then heated to 425° F. in the course of one hour and kept at this temperature for 30 minutes.

Example III

| | Parts by weight |
|---|---|
| Asphaltenes | 100.00 |
| Solvent naphtha | 110.80 |
| Raw linseed oil | 160.00 |
| Turpentine | 160.00 |
| Total | 530.80 |

This varnish is prepared by cold blending a solution of asphaltenes in solvent naphtha with a solution of linseed oil in turpentine.

Example IV

| | Parts by weight |
|---|---|
| Asphaltenes | 100.00 |
| Solvent naphtha | 120.00 |
| Resin A (acid number 63.81) | 160.00 |
| Turpentine | 160.00 |
| Iron oleate (8% iron) | 20.00 |
| Total | 560.00 |

This varnish is prepared by cold blending a solution of asphaltenes in solvent naphtha with a solution of resin A in turpentine, and adding to this mixture a solution of iron oleate in solvent naphtha, said solution of iron oleate containing 4% iron.

Resin A, used in the above composition, was formed from the following ingredients, using the proportions indicated.

| | Parts by weight |
|---|---|
| Glycol | 10.95 |
| Phthalic anhydride | 7.29 |
| Linseed oil acids | 68.04 |
| Rosin | 13.72 |
| Total | 100.00 |

Example V

| | Parts by weight |
|---|---|
| Asphaltenes | 100.00 |
| Solvent naphtha | 165.58 |
| Resin B (acid number 19.1) | 240.00 |
| Turpentine | 240.00 |
| Iron resinate (7.3% iron) | 32.82 |
| Total | 778.40 |

This varnish is prepared by cold blending a solution of asphaltenes in solvent naphtha with a solution of resin B in turpentine, and adding to this solution the required amount of a solution of iron resinate in solvent naphtha, said solution of iron resinate containing 2.4% iron.

Resin B, used in the above composition, was formed from the following ingredients, using the proportions indicated:

| | Parts by weight |
|---|---|
| Glycerol | 12.37 |
| Phthalic anhydride | 10.90 |
| Linseed oil acids | 76.73 |
| Total | 100.00 |

*Example VI*

| | Parts by weight |
|---|---|
| Asphaltenes | 100.00 |
| Solvent naphtha | 114.70 |
| Resin C (acid number 24) | 80.00 |
| Turpentine | 80.00 |
| Iron linoleate (5.46% iron) | 14.70 |
| Total | 389.40 |

This varnish is prepared by cold blending a solution of asphaltenes in solvent naphtha with a solution of resin C in turpentine, and adding to the mixture the required amount of a solution of iron linoleate in solvent naphtha, said solution of iron linoleate containing 2.73% iron.

Resin C, used in the above composition, was formed from the following ingredients, using the proportions indicated.

| | Parts by weight |
|---|---|
| Glycerol | 11.07 |
| Phthalic anhydride | 7.30 |
| Linseed oil acids | 36.24 |
| China wood oil acids | 31.69 |
| Rosin | 13.70 |
| Total | 100.00 |

*Example VII*

| | Parts by weight |
|---|---|
| Asphaltenes | 100.00 |
| Solvent naphtha | 132.79 |
| Resin D (acid number 64.39) | 120.00 |
| Turpentine | 120.00 |
| Iron resinate (7.3% iron) | 17.41 |
| Total | 490.20 |

This varnish is prepared by cold blending a solution of asphaltenes in solvent naphtha with a solution of resin D in turpentine, and adding to the mixture the required amount of a solution of iron resinate in solvent naphtha, said solution of iron resinate containing 2.4% iron.

Resin D, used in the above composition, was formed from the following ingredients, using the proportions indicated.

| | Parts by weight |
|---|---|
| Glycerol | 11.84 |
| Succinic acid | 7.66 |
| Linseed oil acids | 66.98 |
| Rosin | 13.52 |
| Total | 100.00 |

*Example VIII*

| | Parts by weight |
|---|---|
| Asphaltenes | 100.00 |
| Solvent naphtha | 100.49 |
| Resin E (acid number 13.53) | 20.00 |
| Turpentine | 20.00 |
| Cobalt linoleate (5.8% Co.) | 0.17 |
| Total | 240.66 |

This varnish is prepared by cold blending a solution of asphaltenes in solvent naphtha with a solution of resin E in turpentine, and adding to this mixture the required amount of a cobalt linoleate solution in solvent naphtha, said solution of cobalt linoleate containing 1.45% cobalt.

Resin E, used in the above composition, was formed from the following ingredients, using the proportions indicated.

| | Parts by weight |
|---|---|
| Glycerol | 10.29 |
| Phthalic anhydride | 7.33 |
| Linseed oil acids | 68.29 |
| Kauri | 14.09 |
| Total | 100.00 |

*Example IX*

| | Parts by weight |
|---|---|
| Asphaltenes | 100.00 |
| Solvent naphtha | 105.40 |
| Soya bean oil | 56.00 |
| China-wood oil | 24.00 |
| Turpentine | 80.00 |
| Lead resinate (10% Pb.) | 1.20 |
| Manganese resinate (6.63% Mn.) | 0.60 |
| Total | 367.20 |

This varnish is prepared by cold blending a solution of asphaltenes in solvent naphtha with a solution of a mixture of China-wood oil and soya bean oil in solvent naphtha, and adding to this mixture the required amount of a lead-manganese resinate drier solution, said lead-manganese drier solution containing 2.5% lead and 1.66% manganese.

*Example X*

| | Parts by weight |
|---|---|
| Asphaltenes | 100.00 |
| Solvent naphtha | 100.48 |
| China-wood oil acids | 20.00 |
| Turpentine | 20.00 |
| Cobalt linoleate (5.8% Co.) | 0.17 |
| Total | 240.65 |

This varnish is prepared by cold blending a solution of asphaltenes in solvent naphtha with a solution of China-wood oil acids in turpentine, and adding to this mixture the required amount of cobalt linoleate drier in solvent naphtha, said cobalt linoleate solution containing 1.45% cobalt.

*Example XI*

| | Parts by weight |
|---|---|
| Asphaltenes | 100.00 |
| Solvent naphtha | 110.80 |
| China-wood oil acids | 80.00 |
| Oleic acid | 80.00 |
| Lead resiate (10% Pb.) | 2.40 |
| Manganese resinate (6.63% Mn.) | 1.20 |
| Total | 374.40 |

This varnish is prepared by cold blending a solution of asphaltenes in solvent naphtha with a solution of a mixture of China-wood oil acids and linseed oil acids in turpentine, and adding to this mixture the required amount of lead-manganese resinate drier solution in solvent naphtha, said solution of lead-manganese drier containing 2.5% lead and 1.66% manganese.

*Example XII*

| | Parts by weight |
|---|---|
| Asphaltenes | 100.00 |
| Solvent naphtha | 100.00 |
| Bodied China-wood oil acids | 55.17 |
| Turpentine | 60.00 |
| Iron laurate (11.43% iron) | 4.83 |
| Total | 320.00 |

This varnish is prepared by cold blending a solution of asphaltenes in solvent naphtha with a turpentine solution of China-wood oil acids bodied with iron laurate. (By iron laurate is meant the reaction product of iron salts with coconut oil acids.) The mixture of China-wood oil acids with iron laurate is prepared from the following ingredients as indicated below.

| | Parts by weight |
|---|---|
| China-wood oil acids | 91.95 |
| Iron laurate (containing 11.43% iron) | 8.05 |
| Total | 100.00 |

The China-wood oil acids are heated to 385° F. and the iron laurate is added slowly and with constant stirring. The mixture is then heated to 425° F. in the course of one hour and kept at this temperature for two hours.

The incorporation of organic iron blending agents, previously referred to, into the compositions containing drying oils, oil modified polyhydric alcohol-polybasic acid resins, or oil acids mentioned in Examples I, II, IV, V, VI, VII XII results in films having markedly higher capability of retaining their luster than films from compositions containing other types of blending agents as in Examples III, VIII, IX, X, XI.

Certain asphaltene compositions may be pigmented as in the following examples.

*Example XIII*

| | Parts by weight |
|---|---|
| Asphaltenes | 14.00 |
| Asphalt oil | 85.00 |
| China-wood oil | 5.00 |
| Pigment | 27.00 |
| Solvent naphtha | 5.00 |
| Total | 136.00 |

*Example XIV*

| | Parts by weight |
|---|---|
| Asphaltenes | 14.00 |
| Asphalt oil | 85.00 |
| Resin A | 5.00 |
| Pigments | 27.00 |
| Solvent naphtha | 5.00 |
| Total | 136.00 |

The composition of resin A used in the above examples was prepared as described in Example IV.

In preparing these pigmented finishes the pigments are first dispersed by means of suitable grinding equipment in a portion of the vehicle comprising the varnish. The asphaltenes are then added to the pigment paste in the form of a solution in asphalt oil, the remaining ingredients are added, and the mixture is stirred until the system is completely homogeneous.

These asphaltene finishes may be air dried or baked, but better durability is usually obtained with baked finishes. The asphaltene varnish which forms the final coat in all modifications of my process may be a straight solution of asphaltenes in a suitable volatile solvent, such as mineral spirits, benzene, toluene, or turpentine, but I prefer to incorporate with the asphaltenes a drying oil, such as linseed oil, China-wood oil, soya bean oil, fish oils, etc.; oil modified polyhydric alcohols—polybasic acid resins; or drying oil acids, such as those mentioned in the examples, in order to decrease the brittleness of the asphaltenes when they are spread in thin films. These film forming materials, whether the free drying oil acid itself, the drying oil or the oil modified resins, all contain the acid radicals of the fatty oil. In the case of the drying oils and oil modified resins the acid radicals of the drying oil are present in chemical combination as a glyceride of the oil acid. From 2½ to 7½ gallons of oil, oil modified polyhydric alcohol-polybasic acid resin, or oil acids to 100 pounds of asphaltenes is usually sufficient for this purpose, but in some cases where a high degree of elasticity is desired I may use with good results as high as 20 gallons of these modifying ingredients per 100 pounds of asphaltenes. With raw oils, such as raw linseed oil, 30 to 40 gallon varnishes have been prepared which are satisfactory for use in certain applications. When these varnishes are pigmented with carbon black, china clay, asbestine, etc., they may be used with excellent results when their gallon lengths considerably exceed 20 gallons. Varnishes designed for use under severe conditions of weathering, however, should lie below 20 gallons and, preferably, below 10 gallons in oil length.

The term "gallon" is used herein as designating a weight of 8 pounds of oil per 100 pounds of asphaltenes. For example, a 5 gallon asphaltene-oil varnish contains approximately 40 pounds of oil to 100 pounds of asphaltenes. These varnishes may be used either with or without driers, but it has been found that more satisfactory varnishes can be obtained if driers, such as the resinates, oleates, or linoleates of cobalt, lead, manganese, or iron are used. In general, employment of iron organic compounds in asphaltene-oil, asphaltene-oil modified polyhydric alcohol-polybasic acid resin, and asphaltene-oil acid varnishes enables the preparation of satisfactory varnishes of longer gallon lengths than in the case of varnishes prepared either without drier or with cobalt, lead, or manganese driers. This is probably due to the blending action exerted by the iron organic compounds.

To obtain the best results the asphaltene should be substantially free from petrolene, that is, the asphaltene should constitute from 90% to 100% of an asphaltene-petrolene mixture or complex. Inasmuch as the improvement of the coating compositions of the present invention over those in which asphalt is used resides in the asphaltene constituent and the absence of the usual amount of petrolene associated therewith, I do not desire to be limited strictly to the above because it will be apparent that improved compositions will result through the use of asphaltic substances in which the asphaltenes are present in a higher ratio than they are in the asphalt from which the two constituents are derived. It is to be understood, therefore, that the reference to asphaltenes substantially free from petrolenes in the claims is intended to include also asphaltic substances containing both asphalenes and petrolenes, provided the proportion of petrolenes with respect to the asphaltenes is sufficiently low to permit realization of the objects of the invention.

The coating compositions herein disclosed are of particular utility as top coatings for fabrics which are exposed to the weather and sun. These compositions are especially valuable as coatings for automobile top materials because of their resistance to deterioration and their capability of retaining an attractive appearance after long use.

When applying the composition to the automobile top material, usually rubber coated fabric, I may use a one-coat system or a two-coat system. In the one-coat system, which is the simplest form of my invention, the asphaltene coating composition is applied over the uncured rubber and then subjected to a suitable temperature for a sufficient time to vulcanize the rubber and to thoroughly fuse the asphalt film. By this treatment I obtain on the surface of the goods a smooth, continuous film which is chemically inert and which remains for a long time unaffected by sunlight. The temperature and time of cure depend on the rubber compound and especially on the kind of accelerator used in the compound. As a rule, the temperature will lie between 240 to 275° F., and the time of cure will be from 30 minutes to 3 hours. Usually, the composition when applied over rubber is baked for two and one-half hours at 250° F. It is preferred, however, because of the greater durability and better retention of gloss, first to apply an intermediate coating of a varnish, as exemplified below:

*Example XV*

|  | Parts by weight |
|---|---|
| Carbon black | 2.50 |
| Bodied China-wood oil with drier | 20.00 |
| Bodied linseed oil and drier | 20.00 |
| Petroleum residue asphalt | 3.50 |
| Turpentine substitute | 54.00 |
| Total | 100.00 |

This intermediate coat may be "air-dried", if desired, that is, dried at room temperature, but it is more advantageous from the cost standpoint to use a "force dry", that is, dry at an elevated temperature, but below the vulcanizing temperature. Thus, I usually dry for about 4 hours at 180° F., after which I apply the final asphaltene varnish and finish by baking at a temperature of about 240° to 275° F. for such time as is required to complete the vulcanization of the rubber.

My improved coating compositions may also be used in finishing other materials such as nitrocellulose coated and linseed oil coated cloth or paper fabrics and leather, or in some instances the composition may be applied directly to the cloth, paper, or leather. Asphaltenes may also be used in the preparation of coating compositions for various metal surfaces, and in general for other uses to which asphalt coatings are adapted.

The method for preparing asphalenes previously described may be modified as follows: Instead of diluting a concentrated solution of asphalt with low boiling gasoline or pentane, it is possible to extract petrolenes directly from solid asphalt by simply soaking the asphalt in gasoline. This so-called "extraction process" eliminates the dissolving of the asphalt prior to precipitation with gasoline. The extraction method gives a poorer separation of asphaltenes and petrolenes than the precipitation method, however, and is quite time-consuming. Alcohol-ether mixtures, butanol-water mixtures, acetone, and amyl alcohol may be substituted for gasoline as precipitating agents. These mixtures have all been mentioned in the literature.

Wide variations in the nature of coating compositions containing asphaltenes are possible. These variations include not only the nature of the modifying agents which may be blended with asphaltenes but also the proportion in which asphaltenes and modifying agents appear together in the coating composition. The proportions in which asphaltenes and modifying agents may be used together are limited, in general, only by the compatibility of asphaltenes with the modifying agents. Other suitable drying oils, such as perilla or soya bean oil, may be used instead of those mentioned in Examples II and III.

Although glycerol is usually used as the polyhydric alcohol and phthalic anhydride as the polybasic acid in the polyhydric alcohol-polybasic acid resins falling within the scope of the present invention, other polyhydric alcohols, such as glycol and pentaerythritol, and other polybasic acids, such as succinic and adipic acids, may be used. These resins may be made with any of the suitable drying oil acids in the manner indicated, or they may be made with the drying oils themselves, such as linseed, China-wood, or perilla oils, by first heating the glycerol and oil together and then heating the glyceride so formed with the phthalic anhydride. It is intended, therefore, that the term "oil modified polyhydric alcohol-polybasic acid resin" as used in the claims shall refer to resins made with either the drying or semi-drying oils, or with the equivalent amount of oil acids. It has been shown that further modification of the oil modified polyhydric alcohol-polybasic acid resins with rosin, oleic acid, naphthenic acid, kauri, Congo, or similar monobasic materials improves the compatibility and durability characteristics of asphaltene varnishes in which they are used.

Various solvents, such as mineral spirits, turpentine, benzene, and toluene, may be used for dissolving the asphaltenes, as will be understood by those skilled in the art.

The iron compounds used as blending agents should be completely soluble in the thinners and solvents which are used for the varnish. While a wide variety of iron organic compounds are soluble in varnish thinners and, therefore, suitable, I prefer to use the iron salts, either ferrous or ferric, of such acids as abietic acid, oleic acid, linseed oil acids, China-wood oil acids, and similar compounds, because these materials are easily prepared either by precipitation or fusion processes.

Coating compositions containing asphaltenes are superior to prior art finishes of similar type containing natural or petroleum asphalts, pitches, or other bituminous materials in their resistance to deterioration by sunlight and weathering conditions. This is evidenced by the longer period over which asphaltene coating compositions retain their gloss and freedom from chalking and cracking. Asphaltene finishes are also blacker in color, are more rapid drying, and are superior in hardness to similar finishes containing other bituminous materials. This is due to the removal of petrolenes which are fluid in nature, light in color, and without drying properties.

As many apparently widely different embodiments of this invention may be made without departing from the spirit and scope thereof, it is to be understood that I do not limit myself to the specific embodiments thereof except as defined in the appended claims.

I claim:

1. A coating composition comprising a film forming material containing the acid radicals of drying oil, and asphaltene derived from asphalt by separating out the petroleum naphtha soluble constituents, said composition being substantially free from petrolene.

2. A coating composition comprising free fatty oil acids and asphaltene derived from asphalt by separating out the petroleum naphtha soluble constituents, said composition being substantially free from petrolene.

3. A coating composition comprising a drying oil and asphaltene derived from asphalt by separating out the petroleum naphtha soluble constituents, said composition being substantially free from petrolene.

4. A coating composition comprising asphaltene and a polyhydric alcohol-polybasic acid resin containing the acid radicals of oils of the class consisting of drying and semi-drying oils, said composition being substantially free from petrolene.

5. A coating composition comprising asphaltene and a polyhydric alcohol-polybasic acid resin containing the acid radicals of oils of the class consisting of drying and semi-drying oils and containing in addition the acid radicals of natural resin acid, said composition being substantially free from petrolene.

6. A coating composition comprising asphaltene, an organic iron compound, and a polyhydric alcohol-polybasic acid resin containing in combined form the acid radicals of oils of the class consisting of drying and semi-drying oils, said composition being substantially free from petrolene.

7. The composition set forth in claim 5 in which the resin is a glyceryl phthalate resin containing said acid radicals.

8. An artificial leather comprising a rubber coated flexible fabric sheeting having a final coat of dried varnish which comprises asphaltene derived from asphalt by separating out the petroleum naphtha soluble constituents, said varnish being substantially free from petrolene.

9. An artificial leather which comprises a rubber coated flexible fabric sheeting having a final coat of dried varnish comprising asphaltene and a polyhydric alcohol-polybasic acid resin containing the acid radicals of oils of the class consisting of drying and semi-drying oils, said varnish being substantially free from petrolene.

10. An artificial leather which comprises a rubber coated flexible fabric sheeting having a final coat of dried varnish comprising asphaltene, an organic iron compound, and a polyhydric alcohol-polybasic acid resin containing the acid radicals of oils of the class consisting of drying and semi-drying oils, said varnish being substantially free from petrolene.

11. The article set forth in claim 9 in which the resin is a glyceryl phthalate resin containing said acid radicals.

ALFONSO MIGUEL ALVARADO.